United States Patent [19]
Conroy et al.

[11] Patent Number: 5,697,581
[45] Date of Patent: Dec. 16, 1997

[54] TOWPLATE AND METHOD OF DELIVERING CARGO

[75] Inventors: John L. Conroy; Anthony R. Walton; Robert B. Underwood, Jr., all of Ontario; Harold W. Fowler, Jr., Diamond Bar; Gerald E. Koppe, Cucamonga, all of Calif.

[73] Assignee: Lockheed Martin Corporation, Bethesda, Md.

[21] Appl. No.: 521,674

[22] Filed: Aug. 31, 1995

[51] Int. Cl.$^6$ ............................................. B64D 1/12
[52] U.S. Cl. ...................... 244/137.3; 244/152; 244/147; 24/136 A
[58] Field of Search ................ 244/137.3, 161 B, 244/152, 147; 24/136 A, 115 L, 136 R

[56] References Cited

U.S. PATENT DOCUMENTS

| | | | |
|---|---|---|---|
| 3,257,089 | 6/1966 | Samms | 244/151 B |
| 3,840,988 | 10/1974 | Hoffman | 244/151 B |
| 4,291,852 | 9/1981 | Simmons | 244/147 |
| 4,303,213 | 12/1981 | Bolender et al. | 244/137.3 |
| 4,830,340 | 5/1989 | Knitig | 24/136 A |

FOREIGN PATENT DOCUMENTS

972546  10/1964  United Kingdom ............... 244/137.3

*Primary Examiner*—Andres Kashnikow
*Assistant Examiner*—Tien Dinh
*Attorney, Agent, or Firm*—Robert A. Schruhl

[57] ABSTRACT

A system and method for aerial cargo delivery is disclosed that uses a linkless towplate having an eccentric cam and a pin. The cargo flexible tension member is isolated from the force of a deployed drogue parachute by a frictional holding force generated by the eccentric cam and the pin. A system and method for aerial cargo delivery is also disclosed that uses a towplate with a link assembly. The towplate has two cylinders that hold the cargo flexible tension member and the drogue parachute flexible tension member.

22 Claims, 11 Drawing Sheets

TOWPLATE AND METHOD OF DELIVERING CARGO

FIELD OF THE INVENTION

The present invention relates generally to a system for aerial cargo delivery using parachutes from aircraft, and more particularly to aerial cargo delivery systems wherein the assemblies can be a link assembly towplate or a linkless towplate.

BACKGROUND OF THE INVENTION

An aerial delivery system (ADS) is frequently used by the military to drop supplies to troops. Two types of ADS's may be defined. The first comprises a bomb shackle, a pair of rails, a ramp, a tow plate, and electrical controls. The second comprises a parachute system, which includes a drogue parachute, an extraction parachute, and a main parachute with the associated rigging lines. In the latter the towplate system connects a cargo pallet and the extraction parachute to the drogue parachute. In operation, the drogue parachute is deployed behind the aircraft as it flies over the drop area. The towplate system restrains the drogue parachute as it is pulled behind the aircraft. If the drogue parachute properly deploys, the operator in control of the ADS will release a towplate link from the towplate system at the appropriate time. The towplate link is then pulled out of the aircraft by the drogue parachute to deploy the extraction parachute. The extraction chute extracts the cargo and cargo pallet directly, or deploys a main parachute which extracts the cargo and lowers it to the ground. An improperly deployed drogue parachute can cause the ADS to malfunction or can cause difficulty maintaining aircraft control.

To alleviate the problems associated with an improperly deployed drogue parachute, various towplate designs have been suggested. For example, U.S. Pat. Nos. 3,759,562 to Keich et al and 3,801,051 to Hosterman et al. disclose a mechanical type towplate that can be released either automatically or manually in an emergency. U.S. Pat. No. 4,651,957 to Minnich, II discloses a prior art towplate system whose useful life is limited by the excessive wear and tear associated with release of the towplate link. The Minnich towplate is mounted flush with the floor of the aircraft which increases the wear on the towplate. In addition, this towplate link, which is currently being used, costs around $800 and there is no guarantee that it can be recovered after the cargo delivery. In addition, it requires extensive installation time.

British Patent No. 2,042,435 to Boeing discloses a prior art towplate that uses an electrical solenoid and a back-up cable system to release a towplate. This towplate can not handle the modern heavier loads.

The prior art towplates used in ADS's are outmoded and inadequate for modern payloads and procedures. For example, due to the mechanical complexity of modern towplates, meticulous installation and adjustment procedures are required during aircraft pre-flight checkout. These procedures increase the time required to prepare an aircraft for an aerial delivery mission and, therefore, the costs associated with these missions.

In addition, the prior art systems have an automatic remote release mechanism and a manual emergency release mechanism. For the automatic remote release system, the towplate link is typically released by applying an electrical signal from the aircraft's navigation computer to a green light circuit and then to a solenoid. However, the typical solenoid does not generate sufficient force to reliably trigger a mechanical mechanism so the loadmaster is required to be constantly ready to activate the emergency mechanical release mechanism. In many cases, due to frequent malfunctions of the electrical system, the loadmaster will activate the mechanical release mechanism every time to avoid any problems. Using the mechanical release mechanism negates the automatic feature that the prior art towplates were intended to provide.

In addition, the prior art towplates experience undue stresses on various parts of the towplate when the towplate is released. These stresses eventually cause the failure of the towplate after repeated use.

Finally, the prior art towplate systems require that an expensive mechanism (the towplate link) be extracted from the aircraft without any guarantee of re-use since the towplate link may be damaged or lost. Each towplate link can cost $800, which becomes prohibitive if one loses or damages a number of towplate links.

OBJECTS AND SUMMARY OF THE INVENTION

It is therefore an object of the present invention to provide a towplate system for an ADS that has a longer lifetime.

It is another object of the present invention to provide a towplate system that uses the more reliable hydraulic system of the aircraft.

It is another object of the present invention to provide a towplate system that decreases pre-flight preparation time and is easy to install.

It is another object of the present invention to provide a towplate system that has redundant hydraulic systems so that the towplate can operate even if the hydraulic systems of the aircraft have failed.

It is another object of the present invention to provide a towplate system that is capable of heavier loads.

It is another object of the present invention to provide a linkless towplate system that is less expensive to operate.

It is another object of the present invention to provide a linkless towplate system for which no part of the system is extracted from the aircraft during use.

It is another object of the present invention to provide a linkless towplate system that uses friction to isolate the force exerted by the deployed drogue parachute from the load.

According to the invention there is provided a towplate for retaining a flexible tension member that connects cargo to a drogue parachute, the towplate comprising: a strap engaging member having a strap engaging surface for engagement with the flexible tension member; an eccentric cam pivotally mounted relative to the member to be pivotable between a first position in which the cam engages the flexible tension member to wedge the flexible tension member between the cam and the strap engaging surface, and a second position in which the cam releases the flexible tension member; a flexible tension member retaining pin removably mounted adjacent to the cam; and a pin actuator means for removing the pin, wherein the flexible tension member follows a serpentine path past the eccentric cam and around the pin.

The pin actuator can be a hydraulic actuator, and the eccentric cam can have a knurled surface.

The towplate can further comprise a cutter in the form of a blade mounted adjacent the pin, and a cutter activator means for activating the cutter.

Further, according to the invention there is provided a towplate for retaining a flexible tension member that connects a cargo to a drogue parachute, the towplate comprising: a strap engaging member having a strap engaging surface; a friction element movably mounted relative to the strap engaging member to be movable towards and away from the strap engaging surface to wedge the flexible tension member between the strap engaging member and the friction element, the strap engaging member and friction element being mounted relative to each other so as to be urged towards each other by the flexible tension member when force is exerted on one end of the flexible tension member; and strap releasing means for releasing the flexible tension member.

The friction element can comprise an eccentric cam having a knurled surface.

The leasing means can comprise a removable pin mounted relative to the strap engaging member and cam such that the flexible tension member follows a serpentine path around the cam and the pin; and a hydraulic pin actuator means for removing the removable pin.

The towplate can further comprise a remotely actuatable cutting device to sever the flexible tension member, the actuator including a hydraulic cylinder.

Still further, according to the invention there is provided a method of controlling the release of aerially delivered cargo using a towplate wherein a flexible tension member connects a cargo to a drogue parachute, the method comprising the steps of: threading the flexible tension member between an eccentric cam and a flexible tension member engaging surface, and around a removable pin to generate a frictional holding force between the cam and the engaging surface; and removing the pin at a desired moment to release the flexible tension member.

The method can further comprise the steps of cutting the flexible tension member in the event of the drogue parachute not deploying properly.

Still further, according to the invention there is provided a method of controlling the release of aerially delivered cargo wherein a flexible tension member connects a cargo to a drogue parachute, the method comprising the steps of: placing a portion of the flexible tension member between two friction elements; transmitting a retaining force onto at least one of the friction elements to retain the flexible tension member between the elements; and releasing the retaining force at the desired moment to release the flexible tension member.

Still further, according to the invention there is provided a towplate assembly for connecting a first flexible tension member, which is connected to a drogue parachute, to a second flexible tension member, which is connected to a cargo, the towplate assembly comprising: a releasable clevis assembly that includes a drogue cylinder, in use, connected to the first flexible tension member; a load cylinder, in use, connected to the second flexible tension member; and a frame connecting the drogue cylinder to the load cylinder, wherein the first tension member, in use, exerts a force on the frame in a first direction, the frame having a load bearing surface, wherein the force in the first direction is counteracted by an opposite force acting on the load bearing surface, the towplate assembly further comprising an arm movable between an engaged position in which it engages the load bearing surface to retain the clevis assembly against the force of the first tension member, and a disengaged position in which it is disengaged from the load bearing surface to release the clevis assembly; and an actuator for moving the arm.

The actuator can be a hydraulic actuator. The frame can include a support structure and a cage movably connected to the support structure to be movable relative to the support structure between a locked position and a release position, the frame and cage nestingly engaging each other in the locked position to define a channel for holding the drogue cylinder captive.

The towplate assembly can further comprise a jettison actuator connected to the cage for moving the cage to its release position in which the drogue cylinder is released from the confines of the channel. The towplate assembly can comprise a detent movable between an unlocked and a locked position for retaining the cage in its locked position, and the jettison actuator can include an arm engagable with the detent to move the detent to its unlocked position.

Still further, according to the invention there is provided a method of controlling the release of aerially delivered cargo using a towplate having a releasable clevis assembly comprising the steps of: connecting the cargo to the clevis assembly; connecting a drogue parachute to the clevis assembly; deploying the drogue parachute; counteracting the force exerted by the drogue parachute on the clevis assembly by moving a retaining arm into engagement with a load bearing surface on the clevis assembly, wherein the load bearing surface faces in the direction of the force exerted by the drogue parachute; and disengaging the retaining arm from the load bearing surface at the desired moment.

Connecting the cargo to the clevis assembly can include connecting a flexible tension member to the clevis assembly, the flexible tension member being connected to an extraction parachute bag, wherein an extraction parachute is housed in the bag and is connected to the cargo.

The drogue parachute can be connected to the clevis assembly by means of a releasable drogue cylinder held captive between two parts of the clevis assembly, the parts being movable relating to each other between a locked position in which the drogue cylinder is held captive, and a release position, the method can further comprise the steps of moving the two parts relative to each other to their release position when a problem is detected requiring the drogue parachute to be jettisoned. One part can be movable and the other part can be stationary, the movable part forming a recess for accommodating the drogue cylinder, and the stationary part having a lip for holding the drogue cylinder captive in the recess when the movable part is in its locked position.

DETAILED DESCRIPTION OF THE PREFERRED EMBODIMENTS

Figure 1:
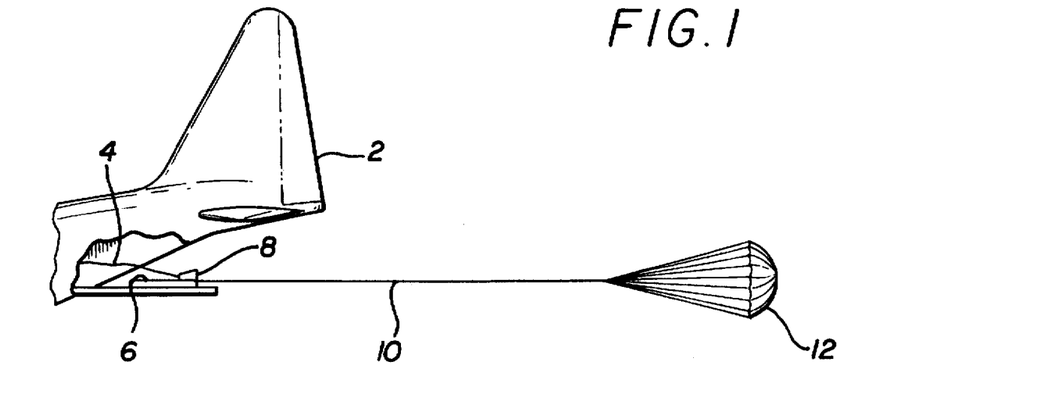
FIG. 1 is a schematic view of an aerial cargo delivery system with a deployed drogue parachute.
Figure 2:
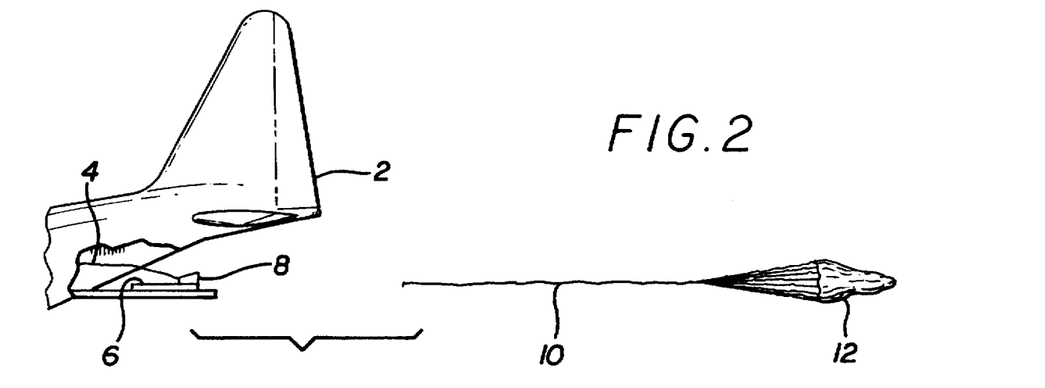
FIG. 2 is a schematic view of an aerial cargo delivery system with a jettisoned drogue parachute.
Figure 3:
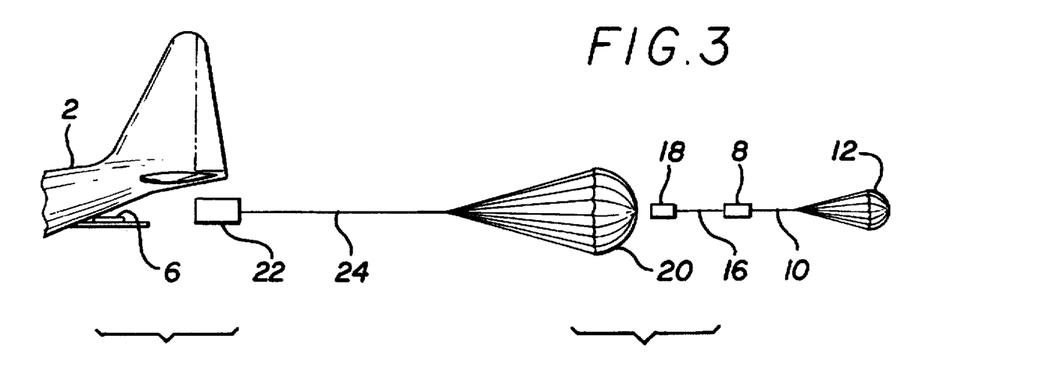
FIG. 3 is a schematic view of an aerial cargo delivery system after successful extraction of the cargo from the aircraft.

In order to more fully introduce the towplate systems of the present invention, the operation of a basic aerial cargo delivery system (ADS) will be described with reference to FIGS. 1–3. An aircraft 2 that is about to deliver an aerial cargo to a drop point is shown in FIG. 1. The aircraft 2 has a rear loading bay 4. Within the rear loading bay 4 is an aerial delivery system 6, which has a towplate system 8. The towplate system 8 connects the cargo to be extracted with a drogue parachute 12 which will be used to pull the cargo or its extraction parachute out of the aircraft. In order to extract a piece of cargo, a drogue parachute 12 is attached to a drogue parachute flexible tension member, such as a strap 10 which is in turn attached to the towplate system 8. For ease of description, the term "strap" will be used. The term "strap" in this application is to be read as covering any flexible tension member. Once the drogue parachute 12 has been deployed behind the aircraft as shown in FIG. 1, it can be either jettisoned in an emergency (as shown in FIG. 2) or it can pull the rest of the cargo (shown in FIG. 2) or a separate extraction parachute out of the aircraft as shown in FIG. 3. If the drogue parachute 12 pulls the extraction parachute out of the aircraft, the extraction parachute in turn extracts the cargo. In the embodiment in which a main parachute is employed to lower the cargo to the ground, the extraction chute 20 is used to deploy the main parachute (not shown).

As shown in FIG. 2, a problem has occurred with the drogue parachute 12 so that the drogue parachute 12 is being jettisoned in order to reset the aerial cargo delivery system. The towplate system 8 detaches the drogue parachute 12 and the drogue parachute strap 10 from the aircraft 2 and allows it to be pulled away from the aircraft. While the aircraft circles back for a further attempt, another drogue parachute can be rehung for the second drop. A successful cargo delivery is shown in FIG. 3. The aircraft 2 is shown leaving the cargo behind. The drogue parachute strap 10 and the drogue parachute 12 are attached to the towplate system 8 which, in turn, is attached by a strap 16 to a parachute bag 18. The parachute bag 18 is pulled away by the drogue parachute, thereby deploying the extraction parachute. The extraction parachute 20 in turn pulls the cargo 22 out of the aircraft using a cargo strap 24. Thus in a successful extraction, the load 22 is pulled out of the aircraft 2 and dropped to the ground.

Figure 4:
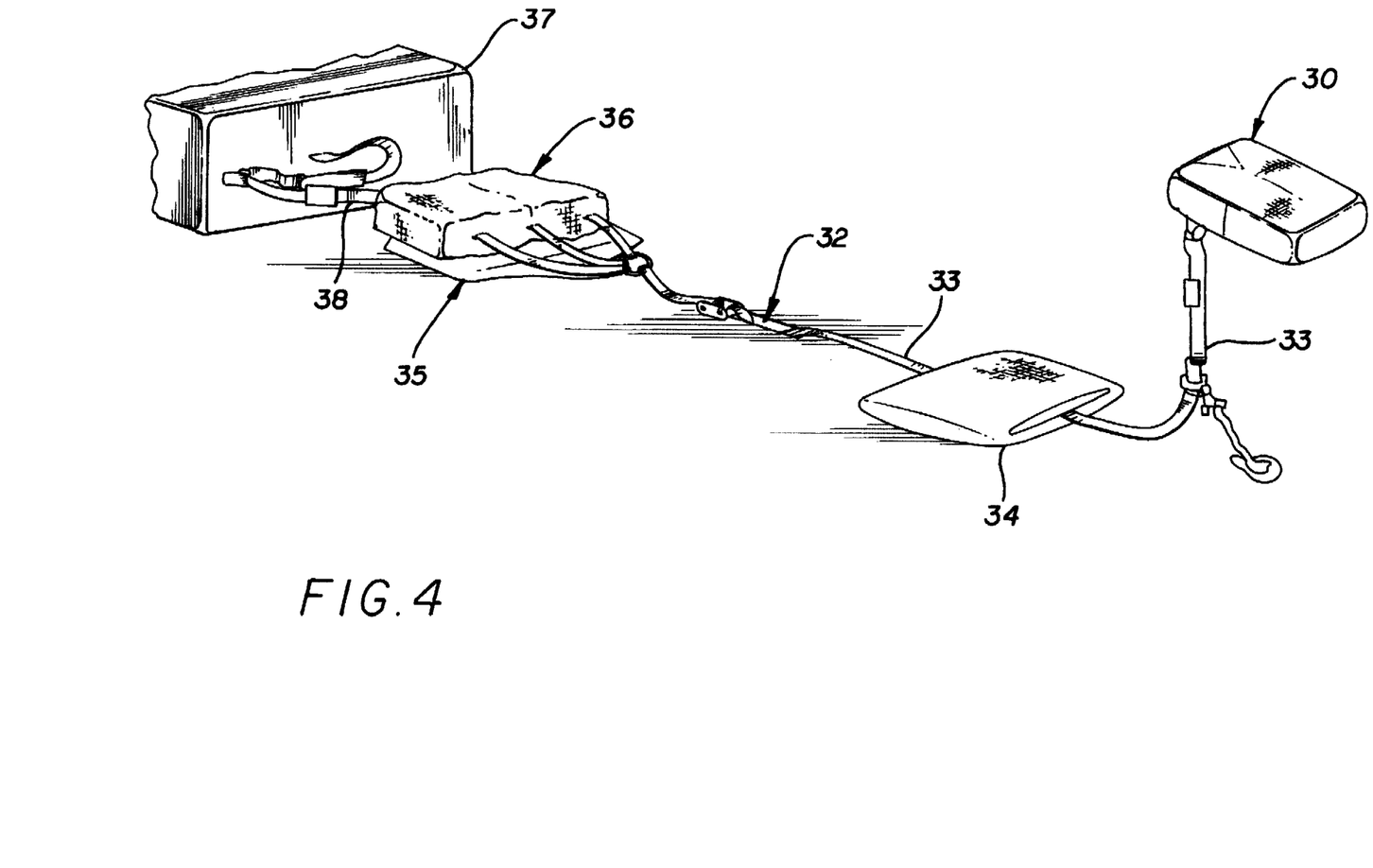
FIG. 4 is a schematic view of an overall aerial cargo delivery system that includes the towplate system of the present invention.

FIG. 4 illustrates an aerial cargo delivery system that uses the towplate of the present invention. The drogue parachute is housed in a drogue parachute bag 30 and is connected to the towplate 32 by means of a drogue line 33. The rear end of the drogue line 33 is thus connected to the drogue parachute, and excess drogue line 33 is stored in a drogue line leaf bag 34 to keep it from blowing around prior to deployment of the parachute. The drogue line 33 is restrained by the towplate 32 and the front end of the drogue line 33 is connected to the extraction parachute bag 36. The extraction parachute is, in turn, connected to the load 37, by means of an extraction line 38. Once the drogue parachute is properly deployed, the towplate mechanism is activated at the appropriate moment, thereby allowing the drogue parachute 30 to pull the extraction parachute bag 36 out of the aircraft. This deploys the extraction parachute which, in turn, pulls out the load 37.

Figure 5:
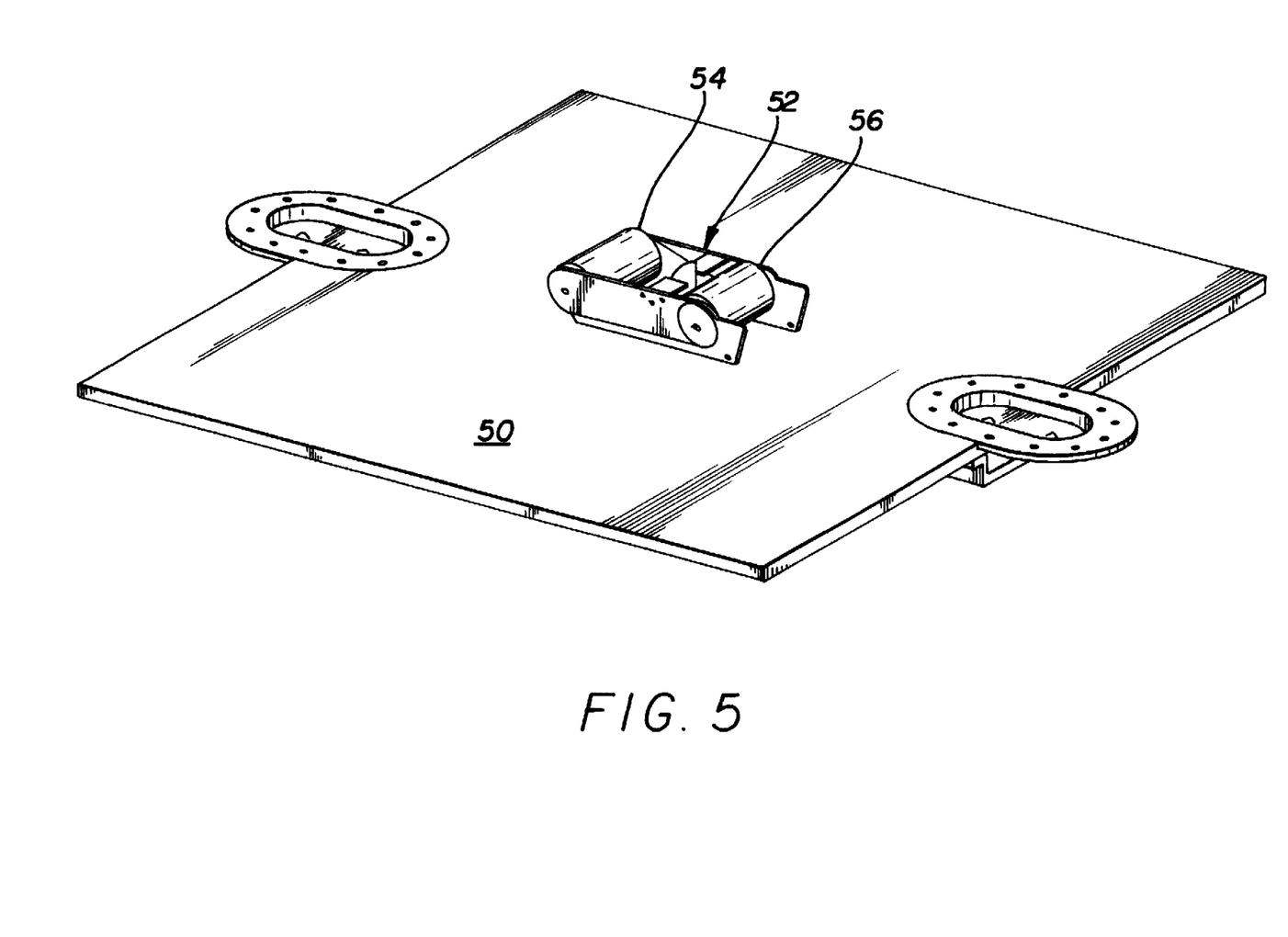
FIG. 5 is an isometric top view of an embodiment of the linked towplate system of the invention.

FIG. 5 illustrates a linked towplate embodiment of the present invention. The towplate link is shown with respect to the floor of the aircraft 50. The towplate link assembly 52, also know as a clevis assembly, is not flush with the aircraft floor 50, but is held above the floor. The towplate link assembly 52 has cargo or load cylinder 54 and a drogue cylinder 56. The operation and details of the cylinders 54 and 56 are described below with reference to FIGS. 7–13.

Figure 6:
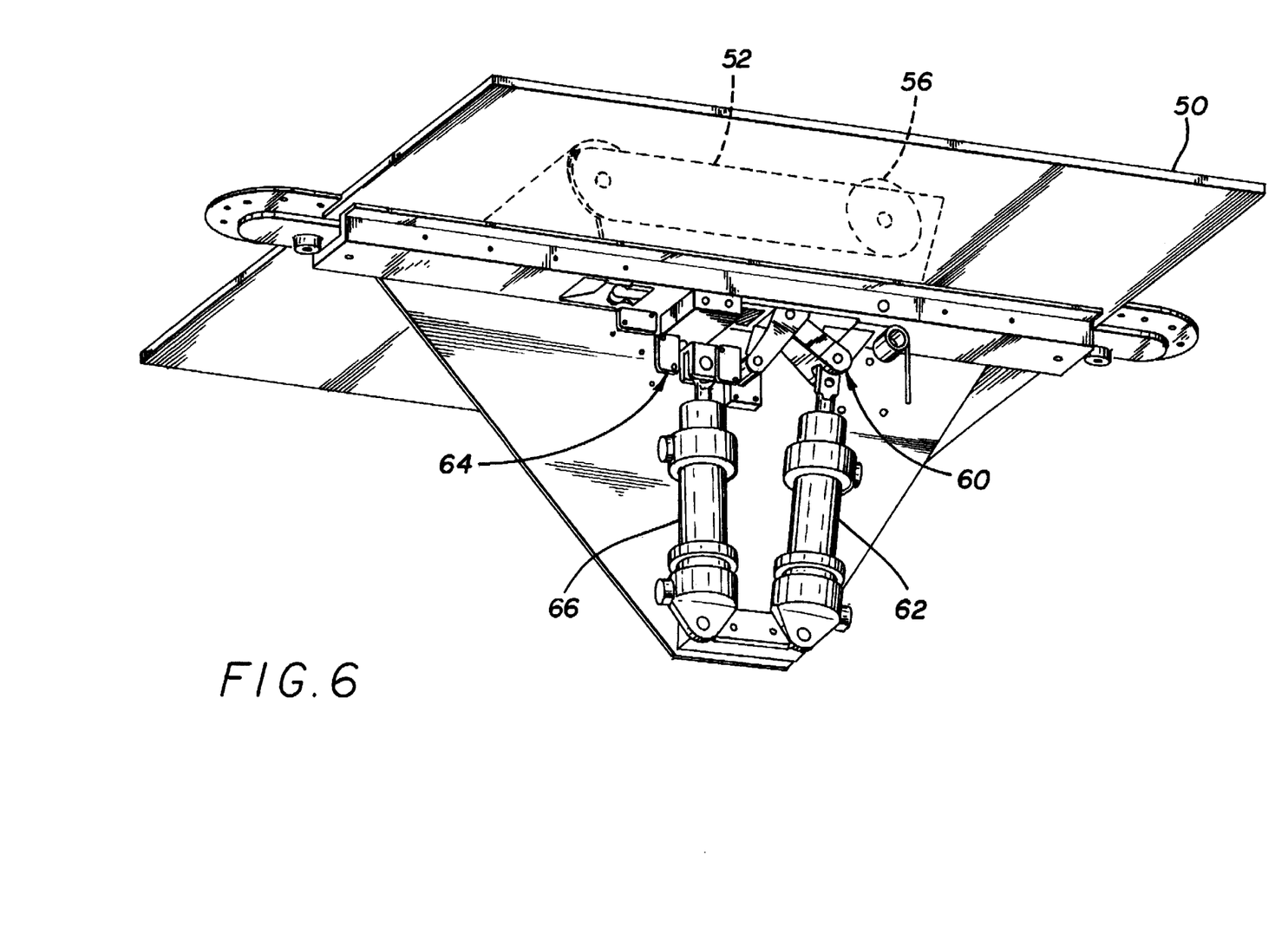
FIG. 6 is an isometric bottom view of the linked towplate system shown in FIG. 5.

A more detailed view of the mechanical structure of the towplate link assembly 52 of FIG. 5 is shown in FIG. 6. Once again, the aircraft floor 50 is shown for orientation purposes. The towplate link assembly 52 with its drogue cylinder 56, is shown above the floor in broken lines. Beneath the floor 50 is the main mechanical structure of the towplate assembly. The towplate assembly includes a release mechanism 60, which is actuated by a release actuator 62. In the illustrated embodiment, the release actuator 62 is a hydraulic actuator. The details of the release mechanism 60 and the release actuator 62 will be described in greater detail below. The towplate assembly also includes a jettison mechanism 64 (shown in FIG. 7) and a jettison actuator 66. In this embodiment, the jettison actuator 66 is another hydraulic cylinder. The operation of the jettison mechanism 64 and the jettison actuator 66 will be described below in more detail.

Figure 7:
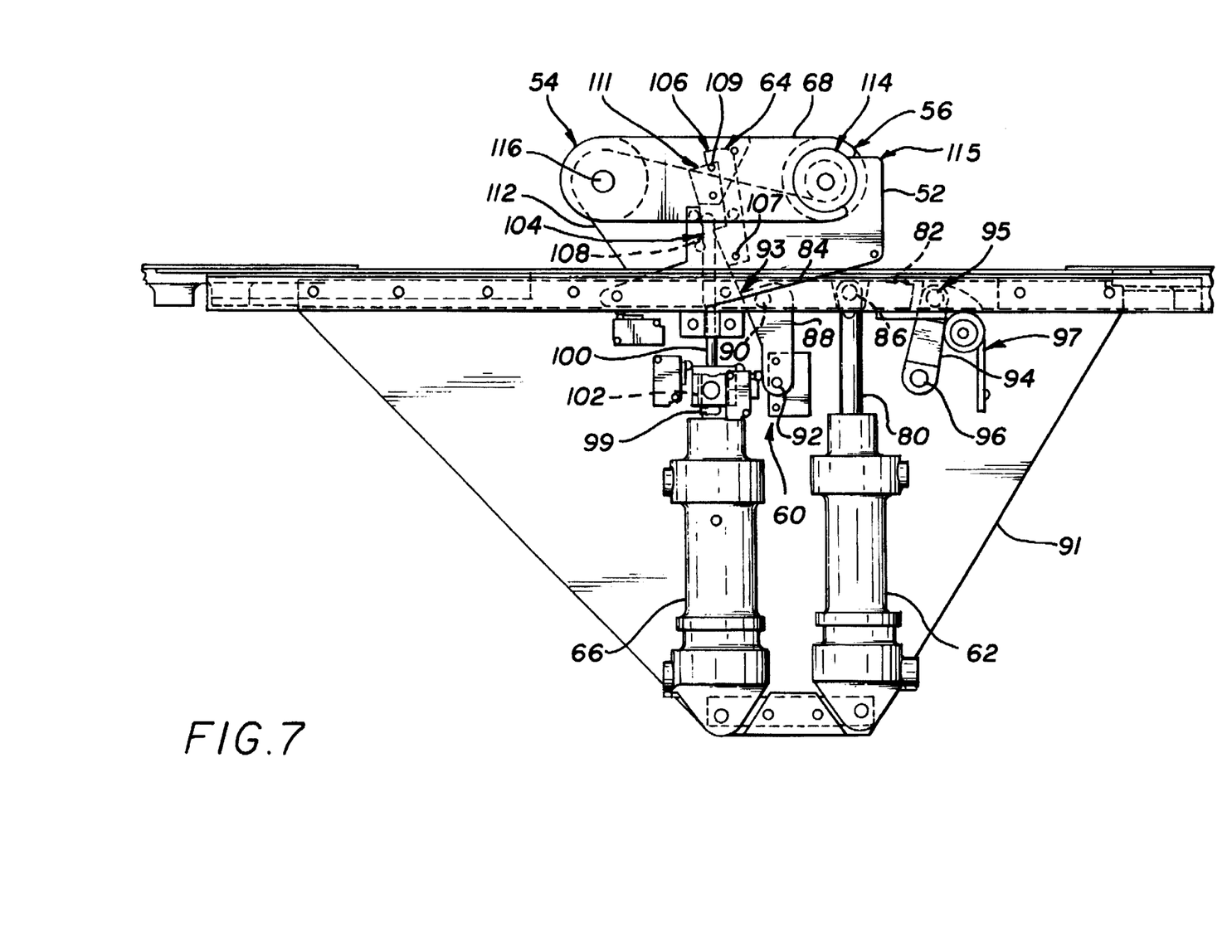
FIG. 7 is a detailed side view of the linked towplate system shown in FIG. 6.

A detailed schematic view of the towplate of the present invention is shown in FIG. 7. The towplate link assembly 52 has, as described above, the load cylinder 54 and the drogue cylinder 56. The clevis or towplate link assembly 52 includes a pivotable cage assembly 68 which will be described in more detail below. Now, the release mechanism 60 will be described in greater detail. The release actuator 62 includes a piston rod 80. The piston rod 80 is connected to a pair of link arms 82, 84, by means of a pivot pin 86. The link arm 84 is, in turn, connected to a retention plate 88, by means of a pivot pin 90. The retention plate 88 is pivotally mounted on the framework 91 of the towplate assembly, to be pivotable about a pin 92. Thus, movement of the piston rod 80 will cause pivotal movement of the plate 88 about the pin 92. The plate 88 engages a contact surface 93 on the towplate link assembly 52. The link arm 82 is, in turn, pivotally connected to a link 94, by means of a pin 95. The link 94 is pivotally mounted on the framework 91 by means of a pin 95. Prior to actuation of the release mechanism, the piston rod 80 is in its extended position, as illustrated in FIG. 7. In this position, pivot pin 86 is located above the level of pins 90 and 95. The piston rod 80 is retained in this position by means of hydraulic pressure and a spring 97. Upon actuation of the release actuator 62, the piston rod 80 moves downwardly causing the retention plate 88 to pivot about the pin 92 and disengage from the load bearing contact surface 93 of the towplate link assembly 52. A simplified illustration of the towplate assembly is given in FIG. 8, which illustrates the retention plate 88, engaging the load bearing surface 93.

Referring again to FIG. 7, the hydraulic jettison actuator 66 includes a piston rod 99. The piston rod 99 activates the jettison mechanism 64. The rod 99 is pivotally connected to a jettison rod 100, by means of a pivot pin 102. The jettison rod 100 extends into a plunger 104. A latch 106 is pivotally mounted on a pin 107 and is provided with a camming surface 108 which engages a complimentary surface on the plunger 104. The upper end of the latch 106 has an angled portion forming a lip and having a latching surface 109. The latching surface 109 engages a bracket 111 on the pivotable cage assembly 68. The bracket 111 thus defines a complimentary seat for the latching surface 109, to retain the cage assembly 68 in its locked position, as illustrated in FIG. 7. The drogue line (not shown) is connected to the drogue cylinder 56, and the extraction chute (not shown) for the load, is connected to the load cylinder. The cylinder 54 is rotatably connected to the rotatable cage assembly 68, which is, in return, rotatably mounted on a housing 112. The cage assembly 68 has a semi-circular concave end 114 which opposes a lip 115 of the housing 112. The lip 115 has a concave inner surface that defines a channel with the semi-circular end 114. The channel rotatably supports the cylinder 56. Under normal operation the cage assembly 68 remains in its locked position, thereby connecting the drogue line to the extraction parachute. However, in the event of something going wrong, and the drogue parachute not completely deploying, the jettison mechanism is actuated to pivot the cage assembly about the axle 116, and release the cylinder 56. The operation of the jettison mechanism 64 will be described in more detail below with reference to FIGS. 8 to 11.

To more fully understand the structure of the towplate of the present invention, the operation of the towplate is shown in several stages. First the towplate is shown in a locked position in FIG. 8. Then the towplate is shown in an unlocked and extraction position in FIG. 10. Finally, the towplate is shown in a jettison position in FIG. 12 in which the drogue cylinder 56 is jettisoned.

Figure 8:
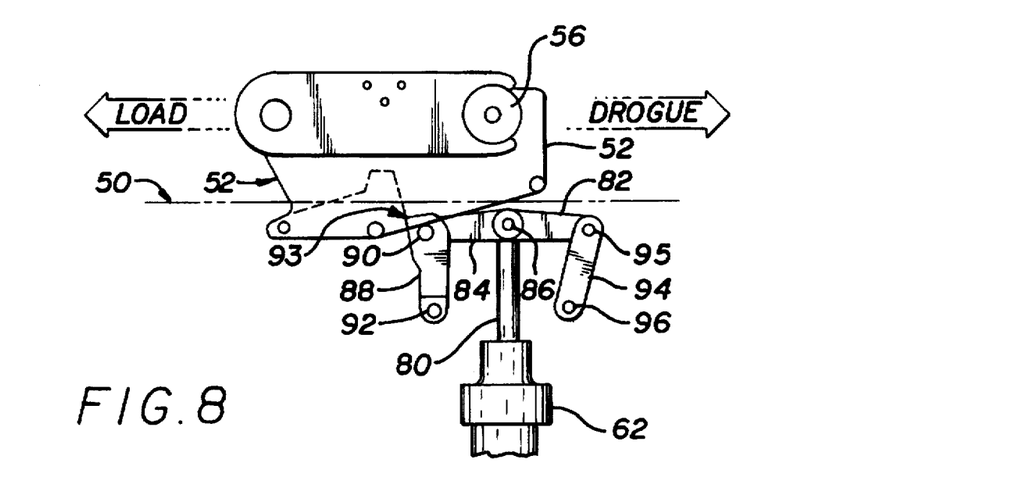
FIG. 8 is a schematic side view of the linked towplate system in a locked position.
Figure 9:
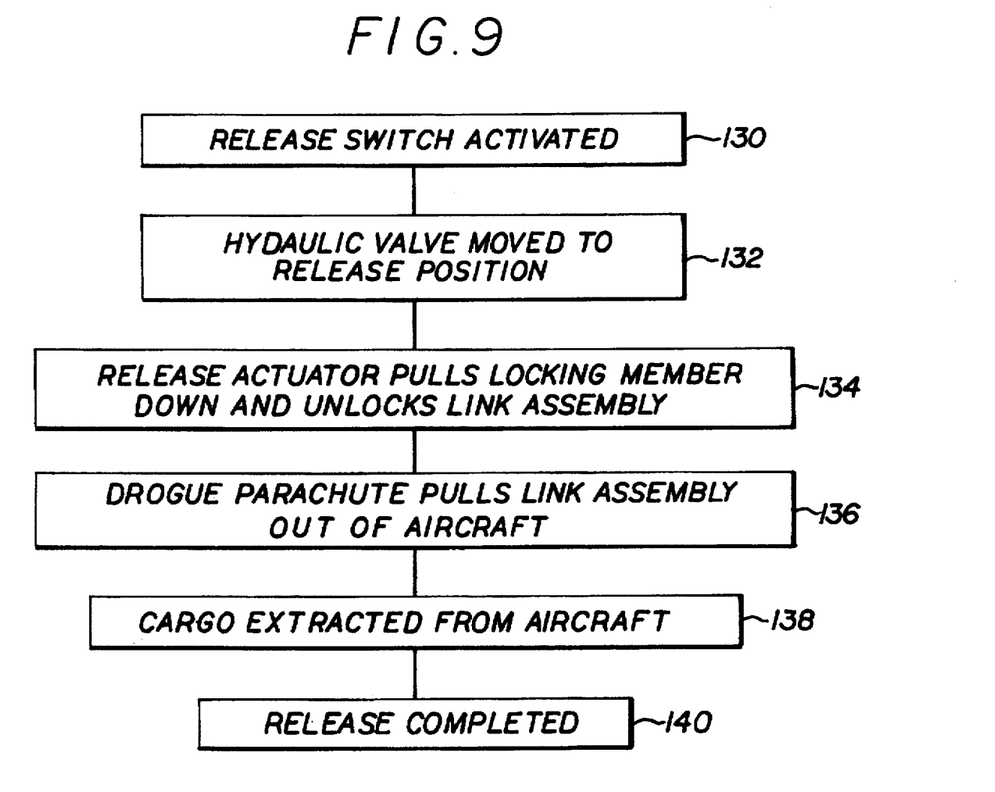
FIG. 9 is a flow chart showing a method of releasing aerial cargo using the linked towplate system shown in FIG. 5.
Figure 10:
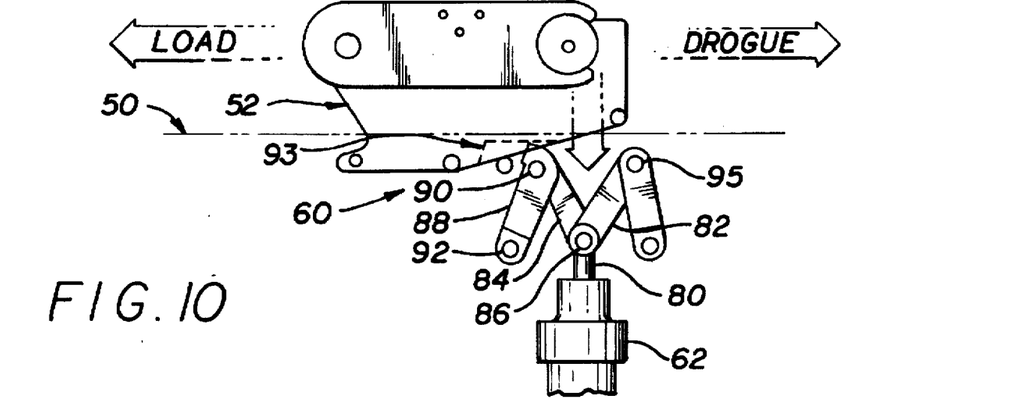
FIG. 10 is a schematic side view of the linked towplate system in a release position.

FIG. 8 shows the towplate in a locked position. In the locked position, the towplate link assembly 52 is connected to the aircraft and isolates any force created by the drogue parachute once the parachute is deployed. This prevents the load from being extracted accidentally. Thus, the towplate link assembly 52 allows the drogue parachute to be towed behind the aircraft and be fully deployed prior to extracting the cargo. As shown, the larger portion of towplate link 52 is located above the floor top 50. In the locked position, the release actuator 62 is in an inactive state, with the rod 80 fully extended forcing the center of pivot pin 86 out of horizontal alignment with the centers of pivot pins 90, 95 (i.e., over-center). With the rod 80 fully extended, the link arms 82, 84 are at an angle to each other. Also, the retention plate 88 is in an upward position. The plate 88 engages the surface 93 which is part of the towplate link assembly 52. Thus the towplate link 52 is prevented from moving. Any force generated by the drogue parachute, as shown by the arrow, does not cause the cargo to be extracted. In other words, the towplate link 52 isolates the cargo from the drogue parachute force. Referring to FIGS. 9 and 10, the method of releasing the towplate link of the present invention will be described. FIG. 9 is a flow chart showing the steps in the release of the towplate link. The method shown in FIG. 9 will be described with reference to FIG. 10 which shows the mechanical structure of the towplate in a release position. To release the towplate link 52, in step 130, a release (green light) switch in the aircraft ADS circuitry (not shown) is activated. Then in step 132, a hydraulic valve (not shown) is moved into the release position. In step 134, the release actuator 62 pulls the locking member down and away from the towplate link. This unlocks the towplate link and allows it to be extracted from the aircraft. In step 136, the drogue parachute pulls the towplate link out of the aircraft. In step 138, the cargo is extracted from the aircraft by the force of the extraction parachute or a main parachute. Then in step 140, the release is completed and the extraction has been successful.

As shown in FIG. 10, the locking actuator 62 has been actuated and the rod 80 has been retracted. This retraction of the rod 80 causes the various links within the locking mechanism 60 to change orientation. The locking mechanism 60 now takes on a M-shape because the plunger is retracted, causing the pivot pin 86 to move downwards. As the pivot pin 86 moves downward, it pulls the link arms 82, 84 downwards as well. The link arm 84, in turn, exerts a force on the plate 88 causing it to pivot about the pivot pin 92. This pivotal movement of the plate 88 allows the surface 93 to clear the retention plate 88 and allows the towplate link assembly 52 to be extracted. Notice that once the locking mechanism 60 has been retracted, the towplate link can easily slide out of the towplate assembly without excessive wear and tear on the towplate assembly or on the towplate link. In addition, since the towplate link is not flush with the floor of the aircraft, no unnecessary tumbling of the link assembly is required. Thus, minimal wear to the towplate link occurs.

Figure 11:
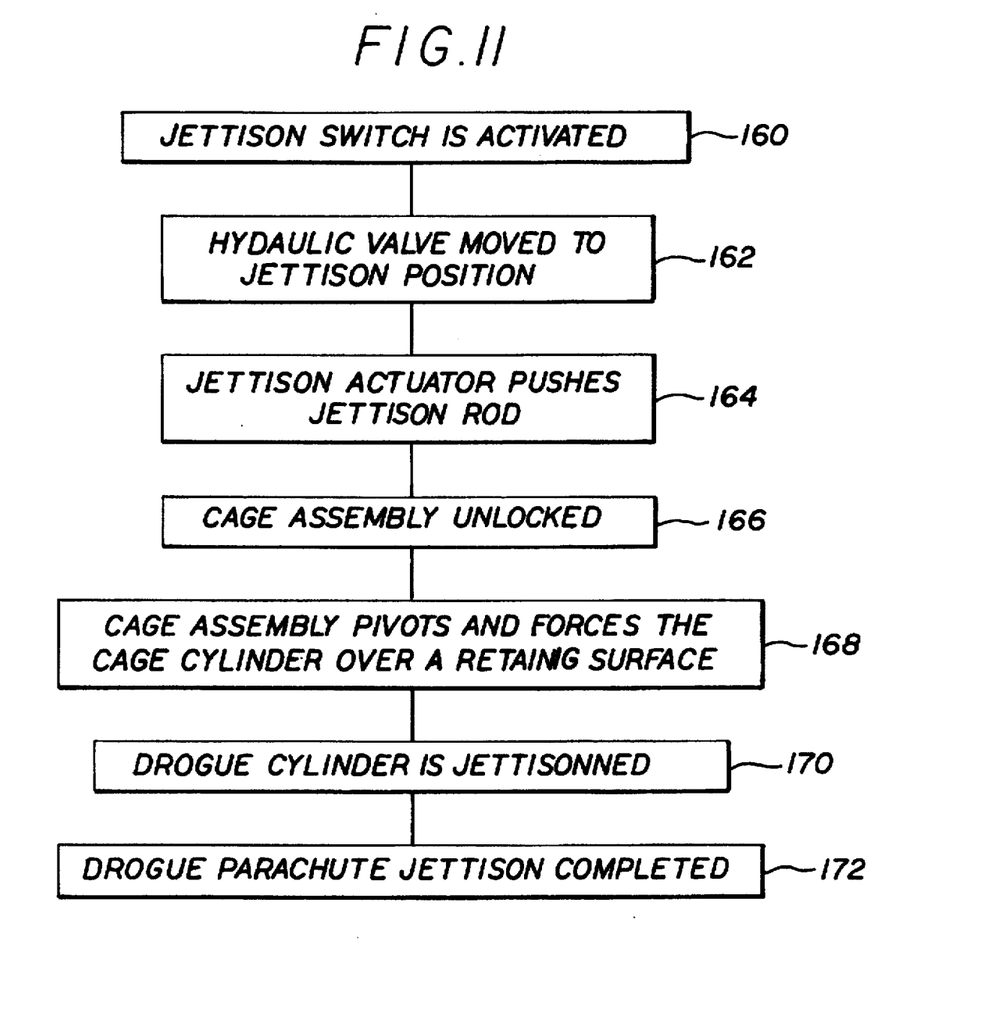
FIG. 11 is a flow chart showing a method of jettisoning the drogue parachute using the linked towplate of the present invention.
Figure 12:
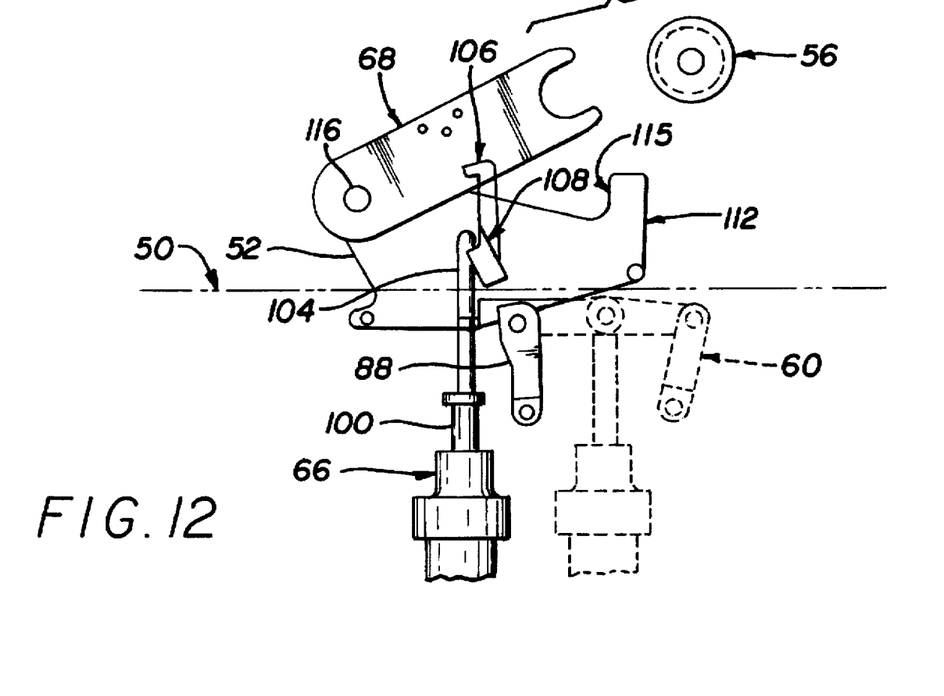
FIG. 12 is a schematic view of the linked towplate system in a jettison position wherein the drogue parachute is jettisoned.
Figure 13:
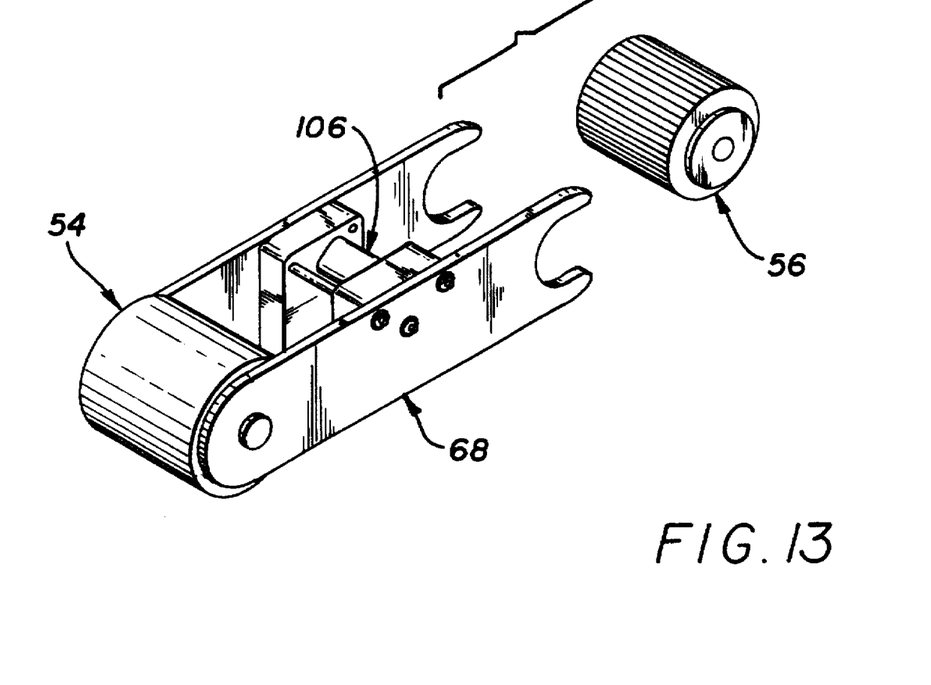
FIG. 13 is an isometric view of the linked towplate system after the drogue parachute has been jettisoned, showing a more detailed view of the cage and cylinders.

FIGS. 11–13 illustrate the steps of jettisoning the drogue parachute. In operation, the drogue parachute will be jettisoned when a malfunction has occurred, such as when a drogue parachute has become tangled or is no longer useful or the cargo delivery has been aborted. This is a necessary feature for any aerial cargo delivery system. In step 160, the jettison switch on the load master towplate control panel (not shown) is actuated. Then in step 162, a hydraulic valve (not shown) is moved into the jettison position. Then in step 164, the jettison actuator pushes the jettison mechanism upwards. Then in step 166, the cage assembly is unlocked and in step 168, the cage assembly pivots and permits the drogue cylinder to clear the retaining lip. In step 170, the drogue cylinder 56 and the drogue parachute line are jettisoned from the aircraft. In step 172 the drogue parachute jettison steps are completed and the aerial cargo delivery system can be reset.

As shown in FIG. 12, the jettison actuator 66 pushes the jettison rod 100 upward which, in turn, pushes the jettison plunger 104. The jettison plunger 104 in turn engages the cam 108 of the latch 106 and causes the latch to move backwards away from the seat defined by the bracket 111. When the latch 106 is rotated backwards from the seat, the lip portion of the latch 106 releases the bracket 111 and the cage assembly 68 is then free to pivot about the axle 116. As the cage 68 pivots about the axle 116, the drogue cylinder 56 is moved over the lip 115 of the link assembly 52. As it is moved over the lip 115, the jettison cylinder 56 is jettisoned. It should be noted, that the towplate link assembly 52 is still locked into the aircraft by the engagement of locking mechanism 60 with locking surface 93 (FIG. 7). After the jettison process, a new drogue cylinder 56 is attached, so that a new drogue parachute can be loaded into the towplate link assembly 52, and the aerial cargo delivery system is reset. FIG. 13 is an isometric side view of the cage assembly 68 after the jettison has occurred. In particular, FIG. 13 shows the cage assembly 68, the load cylinder 54, the drogue cylinder 56, and the latch 106 that holds the cage assembly 68 in its locked position.

Figure 14:
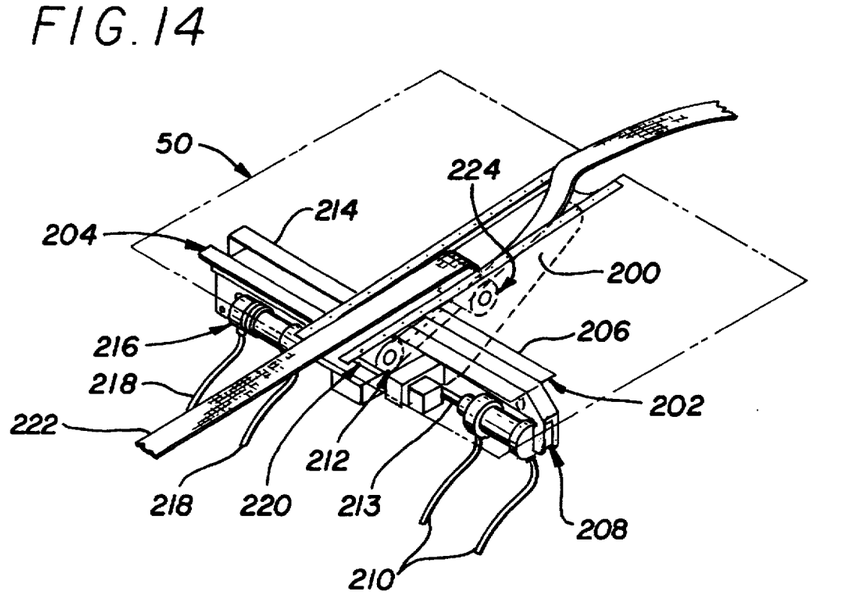
FIG. 14 is an isometric top view of another embodiment of the present invention which uses a linkless towplate.

The preferred linkless towplate embodiment of the present invention will be described with reference to FIGS. 14–19. In FIG. 14, the linkless towplate assembly is shown with reference to the aircraft floor 50. This upper surface of the towplate assembly is entirely flush with the aircraft floor 50. The linkless towplate assembly includes a towplate frame 200, a means to release a strap, such as a pin assembly 202, and a cutter assembly 204. The means to release the strap can be any mechanism that releasably restrains a strap, such as a pin assembly or a shear pin. The pin assembly 202 includes a pin assembly frame 206, a pin actuator 208, hydraulic lines 210, and a pin 212. The frame 206 is connected to the towplate frame 200 and secures the pin assembly 202 to the frame. The pin actuator 208 is connected to the frame 206. In turn, the pin 212 is connected to the pin actuator 208 by a rod 213 of the pin actuator 208. The hydraulic lines 210, provide power to the pin actuator 208. In this embodiment, the pin actuator 208 is a hydraulic cylinder and the lines 210 are preferably hydraulic lines that are connected into the aircraft's hydraulics. Clearly any suitable actuator could be used, such as an electric motor. The operation of the pin will be described in more detail below.

The cutter assembly 204 includes a cutter frame 214, a cutter actuator 216, cutter power lines 218, and a cutter blade 220. The cutter frame 214 connects the cutter assembly 204 to the towplate frame 200. The cutter actuator 216 is connected to the cutter frame 214. In this embodiment, the cutter actuator 216 is a hydraulic cylinder and the power lines 218 are hydraulic lines that are connected to the aircraft hydraulic system to provide power to the cutter actuator 216. The cutter actuator 216 is in turn connected to a cutter 220. The cutter 220 is preferably a blade. The operation of the cutter assembly 204 will be described in more detail below. Also shown in FIG. 14, is a flexible tension member in the form of a strap 222 which connects the cargo to a drogue parachute. This strap 222 follows a serpentine path around a mechanism for strap retention, such as a fictionally engaging eccentric cam 224, around the pin 212, back under the fictionally engaging eccentric cam 224, and finally to the drogue parachute. The detail of the operation of the entire linkless towplate assembly will be described below in more detail. In this embodiment, no part of the towplate is extracted with the cargo.

Figure 15:
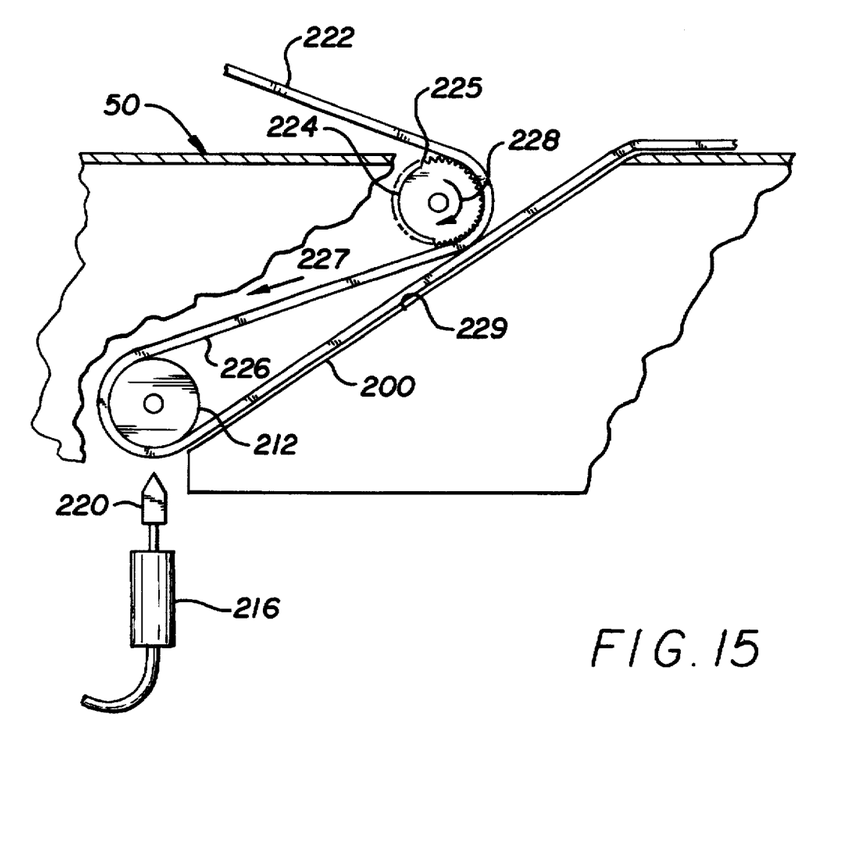
FIG. 15 is a schematic view of the linkless towplate shown in FIG. 14 wherein the linkless towplate system is in a locked position.

The linkless assembly in a locked position is shown in FIG. 15. The strap 222 extends around the fictionally engaging eccentric cam 224 to pin 212, back under the fictionally engaging eccentric cam 224, and then to the drogue parachute. The cutter 220 is in a retracted position and is not touching the strap 222. The fictionally engaging eccentric cam 224 has a knurled surface 225 which frictionally engages the strap as the strap is passed around it. As the drogue parachute is deployed and a force is put on the strap 222 from the drogue parachute, the pin 212 exerts a force on the strap portion 226, in the direction of the arrow indicated by reference number 227. The cam 224 has an off center rotation point so that, as the strap 222 is tightened by the force of the drogue parachute, the fictionally engaging eccentric cam 224 rotates to a first position as shown by the arrow 228 and presses the two portions of the strap 222 against a surface 229 of the frame 200. Thus the surface 229 acts as engagement member for the strap 222. The friction generated by the camming action is sufficient to isolate the force generated by the drogue parachute from the cargo.

Figures 16, 18:
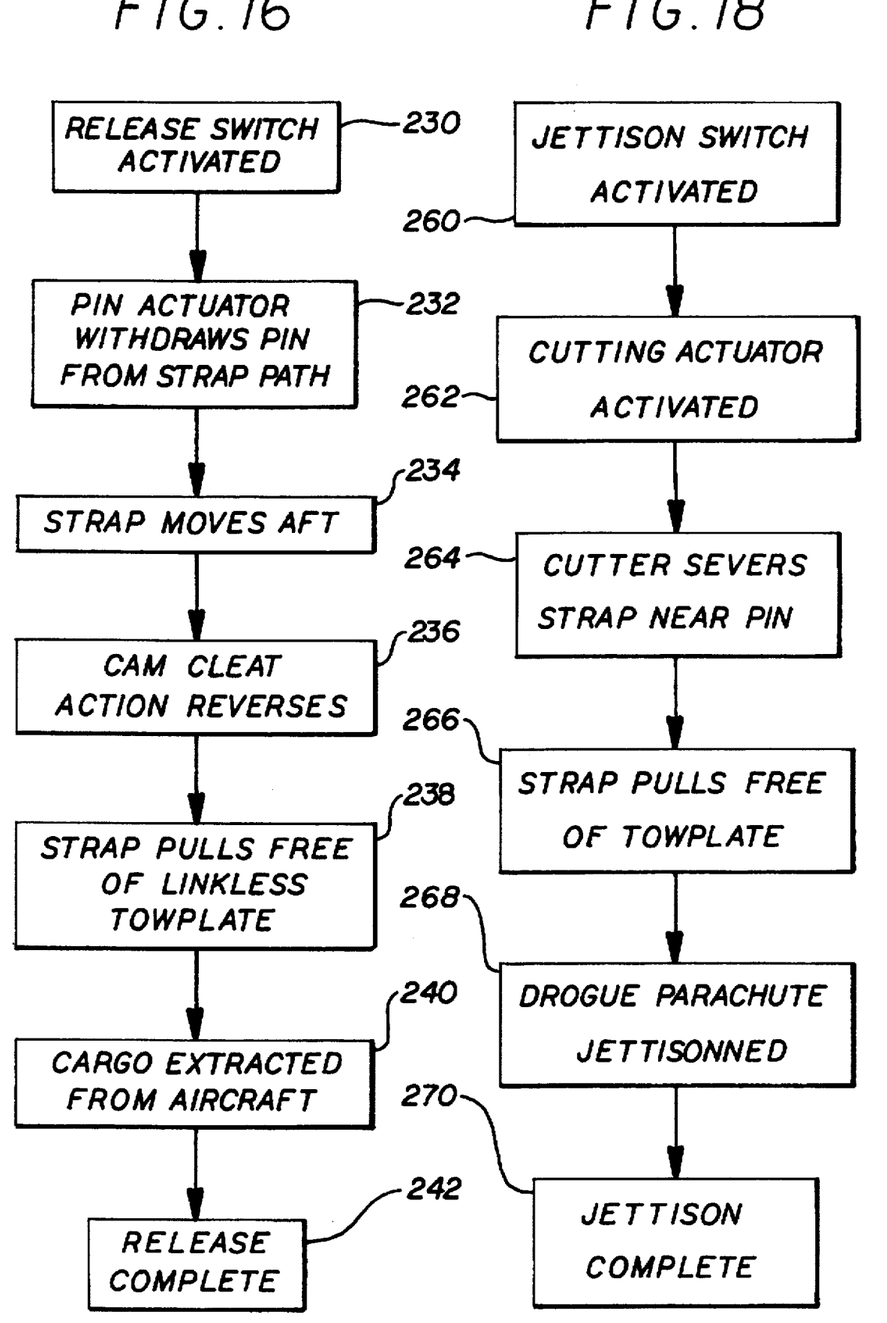
FIG. 16 is a flow chart showing the method of successfully releasing aerial cargo using the linkless towplate system shown in FIG. 14.
FIG. 18 is a flow chart showing the method of jettisoning the drogue parachute using the linkless towplate of FIG. 14.
Figure 17:
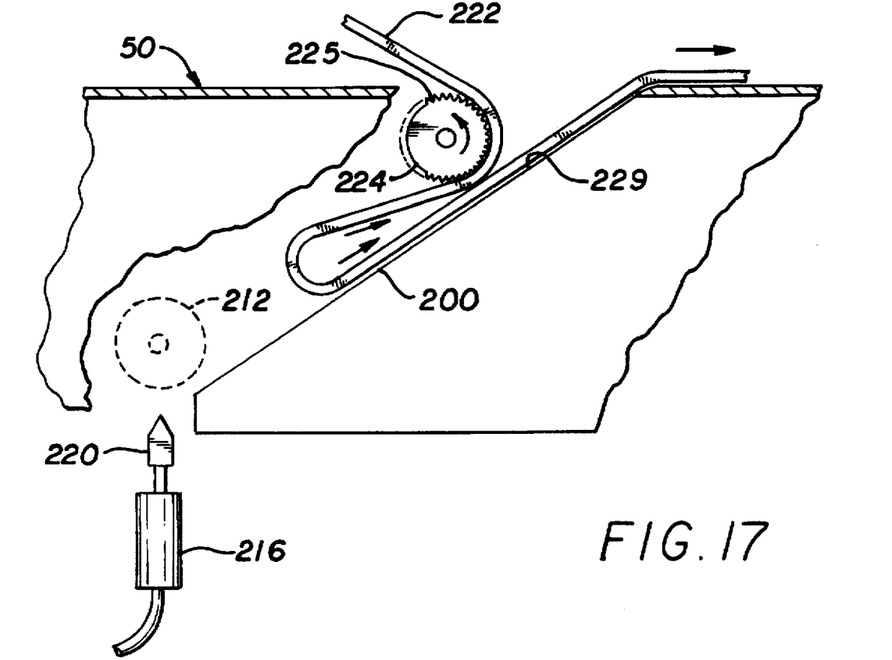
FIG. 17 is a schematic side view of the linkless towplate of FIG. 14 in a release position wherein the cargo is extracted from the aircraft.

Now with reference to FIGS. 16 and 17, the linkless towplate embodiment in a release position will be described. In FIG. 16, the steps of the method of releasing cargo from an aircraft using the present embodiment are shown. In step 230, the release switch is activated. In step 232, the pin actuator withdraws the pin from the path of the strap. This withdrawal of the pin from the strap path eliminates the force on the portion 226 of the strap, in the direction of the arrow 227 in FIG. 15. This allows the strap to move aft in step 234. Then in step 236, the eccentric cam 224 action is reversed and moves away from surface 229 to a second position indicated by numeral 224' which further decreases the friction and allows the strap to move further aft. In step 238, the strap purls free from the linkless towplate assembly and in step 240 the drogue parachute pulls the bag of the extraction parachute free to deploy the extraction parachute and extract the cargo. The release is completed in step 242. As shown in FIG. 17, the strap 222 has been released by the pin 212 (here shown in a shadow fashion), and the strap 222 has started to move aft. In addition, the motion of the fictionally engaging eccentric cam 224 has been reversed which allows the two straps underneath it to separate which decreases the friction on the strap. This in turn allows the strap to slip beneath the fictionally engaging eccentric cam 224 and allows the cargo to be pulled from the plane in a successful extraction. No part of this linkless towplate is extracted from the aircraft with the cargo.

Figure 19:
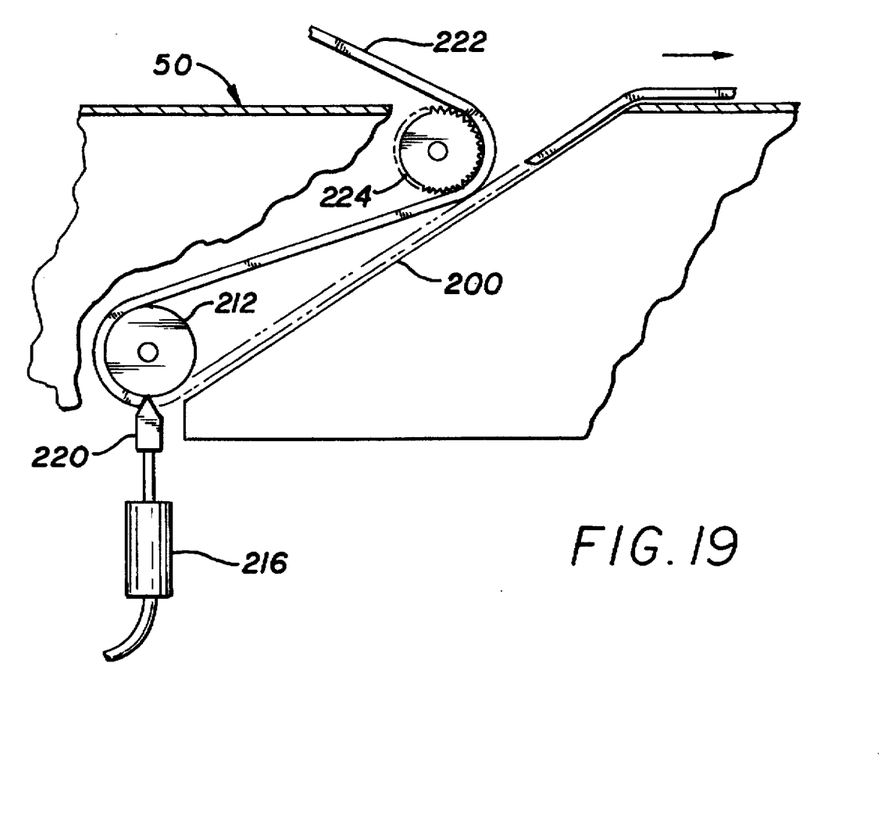
FIG. 19 is a schematic side view of the linkless towplate of FIG. 14 in a jettison position wherein the drogue parachute is jettisoned.

Now with reference to FIGS. 18 and 19, a method of jettisoning the drogue parachute using the linkless towplate of the present invention will be described. With reference to FIG. 18, the step of jettisoning the drogue parachute are shown. In step 260, the jettison switch is activated in the computer. Then in step 262, the cutter actuator is activated. Then in step 264 the cutter actuator causes the cutter to sever the strap at the pin in a horizontal motion. Then in step 266, the strap pulls free from the towplate, and then in step 268, the drogue parachute is jettisoned. The jettison is then completed in step 270. In this method it should be realized that no part of the towplate assembly is lost each time a drogue parachute is jettisoned. The only things jettisoned are the strap and the drogue parachute which are easily replaced. Thus, this method of jettisoning the drogue parachute allows a reduction in the cost of cargo extraction. As shown in FIG. 19, the strap 222 has been cut by the cutter 220 which has been actuated by the cutter actuator 216. The strap 222 has pulled free of the towplate assembly and will allow the drogue parachute to be jettisoned. Then, in order to reload the towplate it is simply a matter of re-connecting a new load strap from the load to the drogue parachute and running it around the eccentric cam and pin in order to reload it. Also, due to the simplicity of the linkless towplate assembly, the time required to check the system prior to operation is reduced as well.

While the invention has been described with reference to specific preferred embodiments, it will be understood by those skilled in the art that various changes may be made and equivalents may be substituted for elements thereof without departing from the true spirit and scope of the invention.

We claim:

1. A towplate for retaining a flexible tension member that connects cargo to a drogue parachute, the towplate comprising:

a strap engaging member having a strap engaging surface for engagement with the flexible tension member;

an eccentric cam pivotally mounted relative to the member to be pivotable between a first position in which the cam engages the flexible tension member to wedge the flexible tension member between the cam and the strap engaging surface, and a second position in which the cam releases the flexible tension member;

a flexible tension member retaining pin removably mounted adjacent to the cam; and a pin actuator means for removing the pin, wherein the flexible tension member follows a serpentine path past the eccentric cam and around the pin.

2. The towplate of claim 1 wherein the pin actuator is a hydraulic actuator.

3. The towplate of claim 1 wherein the eccentric cam has a knurled surface.

4. The towplate of claim 1, further comprising a cutter mounted adjacent the pin, and a cutter activator means for activating the cutter.

5. The towplate of claim 4 wherein the cutter includes a blade and the actuator comprises a hydraulic cylinder.

6. A towplate for retaining a flexible tension member that connects a cargo to a drogue parachute, the towplate comprising:

a strap engaging member having a strap engaging surface;

a friction element movably mounted relative to the strap engaging member to be movable towards and away from the strap engaging surface to wedge the flexible tension member between the strap engaging member and the friction element, the strap engaging member and friction element being mounted relative to each other so as to be urged towards each other by the flexible tension member when force is exerted on one end of the flexible tension member; and strap releasing means for releasing the flexible tension member.

7. The towplate of claim 6 wherein the friction element comprises an eccentric cam.

8. The towplate of claim 7 wherein the eccentric cam has a knurled surface.

9. The towplate of claim 7 wherein the releasing means comprises:

a removable pin mounted relative to the strap engaging member and cam such that the flexible tension member follows a serpentine path around the cam and the pin; and a pin actuator means for removing the removable pin.

10. The towplate of claim 9 wherein the pin actuator means is a hydraulic actuator.

11. The towplate of claim 6, further comprising a remotely actuatable cutting device to sever the flexible tension member.

12. The towplate of claim 11 wherein the cutting device comprises a blade and an actuator that includes a hydraulic cylinder.

13. A method of controlling the release of aerially delivered cargo using a towplate wherein a flexible tension member connects a cargo to a drogue parachute, the method comprising the steps of: threading the flexible tension member between an eccentric cam and a flexible tension member engaging surface, and around a removable pin to generate a frictional holding force between the cam and the engaging surface; and removing the pin at a desired moment to release the flexible tension member.

14. The method of claim 13 further comprising the steps of:

cutting the flexible tension member in the event of the drogue parachute not deploying properly.

15. A method of controlling the release of aerially delivered cargo wherein a flexible tension member connects a cargo to a drogue parachute, the method comprising the steps of:

placing a portion of the flexible tension member between two elements having friction producing surfaces;

transmitting a retaining force onto at least one of the elements causing the friction producing surfaces to apply a force directly to the flexible tension member to retain the flexible tension member between the elements; and releasing the retaining force at the desired moment to release the flexible tension member.

16. A method of controlling the release of aerially delivered cargo using a towplate having a releasable clevis assembly comprising the steps of:

connecting the cargo to the clevis assembly;

connecting a drogue parachute to the clevis assembly, the drogue parachute connected to the clevis assembly by means of a releasable drogue cylinder held captive between two parts of the clevis assembly, the parts being movable relative to each other between a locked position in which the drogue cylinder is held captive, and a release position;

removing the two parts relative to each other to their release position when a problem is detected requiring the drogue parachute to be jettisoned;

deploying the drogue parachute; and counteracting the force exerted by the drogue parachute on the clevis assembly by moving a retaining arm into engagement with a load bearing surface on the clevis assembly, wherein the load bearing surface faces in the direction of the force exerted by the drogue parachute; and disengaging the retaining arm from the load bearing surface at the desired moment.

17. A method of claim 16, wherein connecting the cargo to the clevis assembly includes connecting a flexible tension member to the clevis assembly, the flexible tension member being connected to an extraction parachute bag, wherein an extraction parachute is housed in the bag and is connected to the cargo.

18. A method of claim 16, wherein the retraining arm is moved by means of a hydraulic actuator.

19. A method of claim 18, wherein the two parts are moved relative to each other by means of a jettison hydraulic actuator.

20. A method of claim 19, wherein the two parts are maintained in a locked position by means of a detent.

21. A method of claim 20, wherein the jettison hydraulic actuator engages the detent to release it.

22. A method of claim 18, wherein the one part is movable and the other part is stationary, the movable part forming a recess for accommodating the drogue cylinder, and the stationary part having a lip for holding the drogue cylinder captive in the recess when the movable part is in its locked position.

* * * * *